United States Patent Office 3,083,490
Patented Apr. 2, 1963

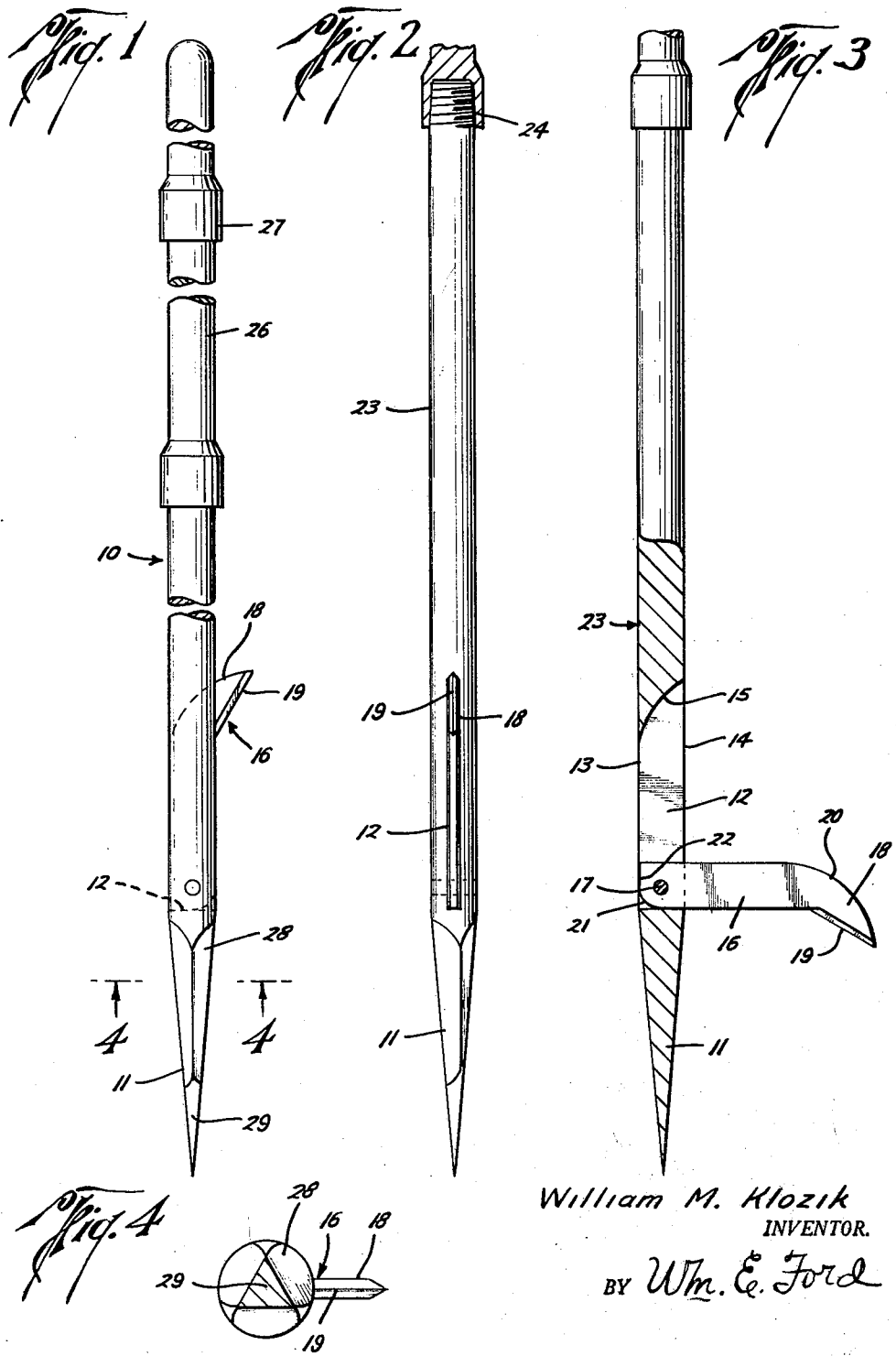

3,083,490
AUTOMATIC SAFETY FLOUNDER GIG
William M. Klozik, 7706 Waxahachie, Houston, Tex.
Filed June 21, 1960, Ser. No. 37,659
5 Claims. (Cl. 43—6)

This invention relates to gigs which are used in fishing, especially to flounder gigs and the like, which include features operable to impale a gigged fish and automatically to support such an impaled fish from below in such a manner that the fish is positively secured against escape whereas the fish impaled may be inspected as to type without the necessity of manually handling the fish.

In the fish gigs currently used in many waters no provision is made for automatically latchably securing an impaled fish to the gig employed to spear the fish, and generally the fisherman must grasp the fish manually to further secure it and to prevent it from slipping off the gig spear and escaping. The fish most widely obtained by gigging is the well known flounder having a spread out, flattened body, but generally other fish inhabit the waters with the flounders as well as other undesirable forms of aquatic life.

The most undesirable denizen encountered by a fisherman who may be gigging for flounder is the well known stingaree, appearing flat like a flounder, but being of the ray family having powerful stinger portions capable of marring the flesh of an operator, often in manner to leave permanent scars. Risk of stingaree infection arises where simple, conventional gigs are being employed and a stingaree is speared by accident while in quest of flounder, the operator thus having to place his hand quickly beneath the object which has been speared to prevent its escape, so that if such object is a stingaree at least the hand placed beneath the stingaree must be severely stung.

As a consequence of the dangers hereinabove outlined, it is a primary object of this invention to provide a fishing gig, as hereinabove generally outlined, which is positive in its operation to automatically latchably impale a fish, as a flounder, on such gig, to be supported from below without manual assistance.

It is another object of this invention to provide such a gig which is positive in operation, simple in construction, and which does not mar the fish impale but in minimum degree in being passed through the fish.

Other and further objects will be apparent when the specification herein is considered in connection with the drawings in which:

FIG. 1 is an elevation of a gig embodying the principles of this invention, and showing the cutting blade in upper position;

FIG. 2 is an elevational view taken at ninety degrees from the view of FIG. 1;

FIG. 3 is an elevational view corresponding to the view shown in FIG. 1 and taken part in section, and shows the cutting blade in lowermost position; and FIG. 4 is a transverse sectional bottom view taken along lines 4—4 of FIG. 1.

Referring in detail to the drawings, in which like reference numerals are assigned to like elements in the various views, a gig for gigging fish, as flounder, is shown in FIG. 1 comprising an elongated gaff or staff 10 with the terminal portion of its lower end sharpened to a point 11. Above the point 11, a slot 12 is provided, as best shown in FIGS. 2 and 3, such slot extending across the gaff from one side to the other.

The upper end of the slot 12 extends inwardly and upwardly from one side 13 to the other side 14 of the slot, and, as shown in FIG. 3, provides an arcuately shaped recess 15. A blade 16, best shown in FIG. 3, has its lower end pivotally mounted on a pivot pin 17 which extends across the slot 12 and is journalled in the gaff on opposite sides of the slot. The blade 16 has its outer end 18 extending angularly downwardly from the longitudinal axis of the blade, as shown in FIG. 3, and the downwardly disposed edge of the outer end 18 is sharpened from both sides down to a fine cutting edge 19 to terminate outwardly in a piercing point 79'. Oppositely of the cutting edge 19 the outer end of the blade 16 provides an arcuate edge 20, the arc of which is arcuately convex upwardly, as shown in FIG. 3.

The lower corner of the blade adjacent the pivot pin 17 is rounded at 21 on the side of the slot from which the blade extends, and square at 22 on the opposite side of the slot. Thus when the blade 16 is pivoted upwardly the arcuate edge 20 is received in stopped position against the inner edge of the recess 15, whereas the corner 22 of the blade 16 latches flush against the lower edge of the slot 12. In this position only the cutting end of the blade projects laterally from the slot and gaff, as shown in FIG. 1, such cutting edge 19 extending upwardly and outwardly from the slot.

Above the slot 12 the lower end 23 of the gaff is shown connected at 24 to an enlargement 25 on the lower end of the gaff handle 26. Thereabove another enlargement 27 is provided to serve as a hand guide and positioning element. As shown in FIG. 4, the point 11 is tapered along three sides 28 and therebelow terminates in a fine conical point 29. This view also shows that, when in the upper position, the blade 16 extends outwardly from the slot a distance less than the diameter of the gaff.

It follows that when a gig produced according to the teaching of this invention is grasped and driven through a fish, as through a flat flounder, the contact of the lower edge of the blade 16 with the fish after the point 11 passes therethrough will force the blade 16 upwardly and in upper position, as shown in FIGS. 1 and 2. Thereafter, as the gig is driven further onwardly through the fish, the projecting part of the blade, as best shown in FIGS. 1 and 4, will be driven through the body of the fish to cut a slot therethrough which is longitudinal length corresponding with the lateral dimension by which the blade 16 extends outwardly from the gaff and slot therethrough.

After the gig is driven far enough that the blade 16 in upper cutting position passes entirely through the fish, the blade is then free to pivot downwardly by its own weight and at this stage the gaff may be quickly lifted upwardly. It will thus follow that the fish impaled thereon is also latchably connected to the gaff as it is supported by the blade which has passed through the body of the fish and now extends outwardly a sufficient longitudinal distance beyond the slot it has cut through the fish to provide the fish with ample latching support from below.

This manner of gigging fish to latch them in an impaled position on the gig obviates any necessity of the operator having to reach underneath the fish to maintain it on the gaff until it can be taken from the water and a string passed through its gills and mouth. Consequently, with this type of gig the stringing operation need not follow immediately but can be done at some point of time later as the operator may desire.

As it often happens that in gigging for flounders a stingaree may be gigged instead. It is only necessary to lift the gaff to bring the stingaree in view and thus warn the operator that he has gigged this harmful type of fish of the ray family which is particularly equipped with barbs or stingers on the end of its tail capable of inflicting severe wounds.

If it then may be desired to keep the stingaree it is only necessary to take an implement, such as a knife and hack off its tail to render it harmless and obtain it for what value it might have.

Since the lower part of the gig is disconnectable from the handle 26 at 24 as by unthreading, it is a very easy matter for the fisherman gigging fish to string the fish as he proceeds through the water. This can be done by unthreading the handle from the lower portion 23 of the gaff and then stringing the fish, as impaled above the blade, and then lifting the strung fish over the lower part 23 or by withdrawing the part 23 downwardly from the fish as the fish is held stringed.

The invention is not limited to the exact disclosure shown nor to the exact method of its use, but other constructions and other method steps of use are considered as well, as such may fall within the broad spirit of the invention and within the broad scope of interpretation claimed for, and merited by the appended claims.

What is claimed is:

1. A gig for gigging fish, as flounders and the like, comprising an elongated gaff having a sharp point on the lower end thereof and provided at the top with a handle whereby it may be thrust into a fish, said lower end having a slot above and adjacent to said point with the lower end of said slot extending through said gaff and with the upper end of said slot forming an arcuate recess extending from one side of said gaff conclavely inwardly and upwardly to the other side, a flat elongated blade of substantially the width of said slot and having an angularly extending end with the edge on one side of said angularly extending end being sharpened to a cutting edge and terminating in a piercing point, pivot means extending through said gaff lower end and the lower end of said slot on which the opposite end portion of said blade from the cutting edge end is pivotally mounted with the edge opposite said cutting edge being convex to bear in said slot recess while said cutting edge extends angularly upwardly with point positioned a spaced distance radially outwardly of the gaff periphery the bottom of said slot extending horizontally when said gaff is upright, and the blade end opposite the cutting end being square with said bottom on the side opposite the cutting edge side to latch in upper position, while the other side of said opposite end is rounded to permit said blade to pivot downwardly after the fish is pierced, whereby when said gaff is thrust downwardly with point to pass into and through a fish said cutting edge follows to cut a narrow slot through the fish which is substantially the length of cutting blade uppermost position lateral extension from said slot and whereby when said blade passes through said fish it pivots downwardly and outwardly as said gaff, above said slot, passes through the fish, whereafter said gaff may be lifted with the fish impaled thereon and supported underneath by said blade.

2. A gig for gigging fish, as flounder and the like, comprising an elongated gaff including a lower end terminating in a sharp point and also including a handle removably connected to said lower end to be grasped whereby to thrust said lower end in a fish, said lower end having a slot above and adjacent to said point with the lower end of said slot extending through said gaff and with the upper end of said slot forming an arcuate recess extending from one side of said gaff conclavely inwardly and upwardly to the other side, a flat elongated blade of substantially the width of said slot and having an angularly extending end with the edge on one side of said angularly extending end being sharpened to a cutting edge and terminating in a piercing point, pivot means extending through said gaff lower end and the lower end of said slot on which the opposite end portion of said blade from the cutting edge end is pivotally mounted with the edge opposite said cutting edge being convex to bear in said slot recess while said cutting edge extends angularly upwardly with point positioned a spaced distance radially outwardly of the gaff periphery the bottom of said slot extending horizontally when said gaff is upright, and the blade end opposite the cutting end being square with said bottom on the side opposite the cutting edge side to latch in upper position, while the other side of said opposite end is rounded to permit said blade to pivot downwardly after the fish is pierced, whereby when said gaff is thrust downwardly with point to pass into and through a fish said cutting edge follows to cut a narrow slot through the fish which is substantially the length of cutting blade uppermost position lateral extension from said slot and whereby when said blade passes through said fish it pivots downwardly and outwardly as said gaff, above said slot, passes through the fish, whereafter said gaff may be lifted with the fish impaled thereon and supported underneath by said blade.

3. A gig as claimed in claim 1 in which said point is removably connected to said lower end and in which said lower end, above said point, is tubular.

4. A gig as claimed in claim 2 in which said handle has enlargement means thereon above the connection of said handle and said lower end to guidably determine hand position thereon.

5. A gig as claimed in claim 2 in which said lower end above said point is tubular and to which said point is removably connected.

References Cited in the file of this patent

UNITED STATES PATENTS

| | | |
|---|---|---|
| 1,302,457 | Ureck | Apr. 29, 1919 |
| 1,832,727 | Nixon | Nov. 17, 1931 |
| 2,598,220 | Dann | May 27, 1952 |